(12) United States Patent
Mack (10) Patent No.: US 6,904,756 B2
(45) Date of Patent: Jun. 14, 2005

(54) TRANSITION DUCT SUPPORT BRACKET WEAR COVER

(75) Inventor: Brian R. Mack, Palm City, FL (US)

(73) Assignee: Power Systems Mfg, LLC, Jupiter, FL (US)

( * ) Notice: Subject to any disclaimer, the term of this patent is extended or adjusted under 35 U.S.C. 154(b) by 52 days.

(21) Appl. No.: 10/377,052

(22) Filed: Feb. 28, 2003

(65) Prior Publication Data

US 2005/0000225 A1 Jan. 6, 2005

(51) Int. Cl.[7] .............................................. F02C 7/20
(52) U.S. Cl. ........................................ 60/796; 60/800
(58) Field of Search .......................... 60/752, 796, 798, 60/799, 800

(56) References Cited

U.S. PATENT DOCUMENTS 3,750,398 A * 8/1973 Adelizzi et al. ............... 60/799
4,422,288 A * 12/1983 Steber ........................... 60/800
5,749,218 A    5/1998 Cromer et al.

* cited by examiner

Primary Examiner—Louis J. Casaregola
(74) Attorney, Agent, or Firm—Brian R. Mack (57) ABSTRACT

A wear cover for use on a gas turbine transition duct support bracket is disclosed. The wear cover, which is manufactured from a single piece of sheet metal, does not require complex manufacturing processes or tools, thereby reducing component cost. The wear cover comprises first and second leg portions substantially parallel to each other and each generally perpendicular to a third leg portion. Each of the leg portions serve to protect a surface of a support bracket finger from excessive wear associated with frictional contact with mounting blocks of a transition duct. The wear cover is designed to slip onto a support bracket finger through a first opening and is fixed to the finger by a means such as welding.

10 Claims, 9 Drawing Sheets

TRANSITION DUCT SUPPORT BRACKET WEAR COVER

BACKGROUND OF THE INVENTION

1. Field of the Invention

This invention relates to gas turbines in general, but more specifically to the interface region between a transition duct and a support bracket assembly.

2. Description of Related Art

Figure 1:
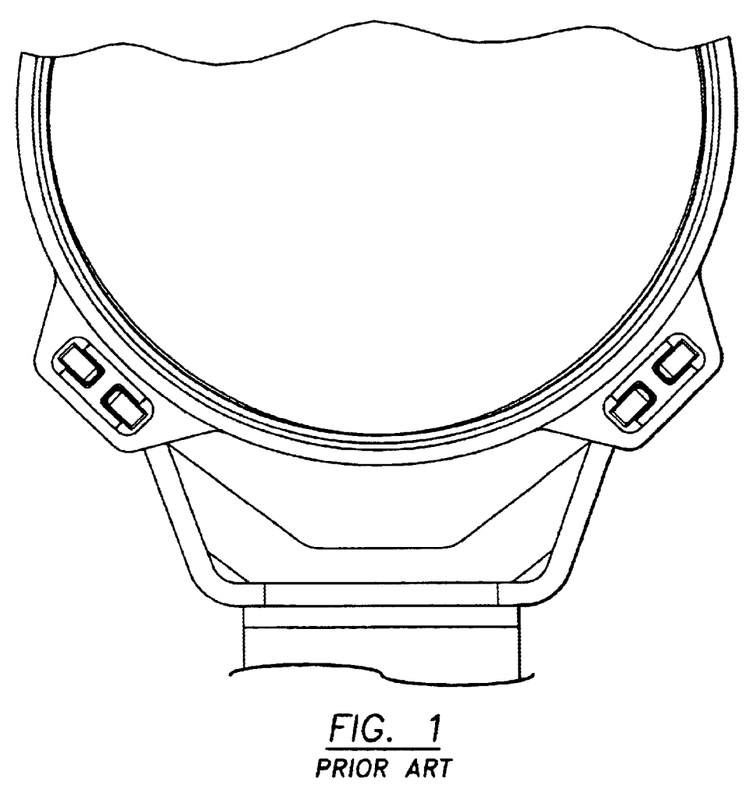
FIG. 1 is an end view of a transition duct inlet and support bracket assembly of the prior art.

In a typical land-based gas turbine engine, a plurality of combustors is positioned in a circular array about the engine such that each combustor delivers hot combustion gases to the turbine. The hot combustion gases are transferred to the turbine through a transition duct. The transition duct, at its inlet end is positioned adjacent the combustor exit by a support bracket. An example of a transition duct inlet and support bracket of the prior art is shown in FIG. 1. Due to the vibrations experienced by the combustion system and adjacent transition duct, frictional contact at the interface region between a support bracket and transition duct has been known to create excessive wear, especially on the support bracket, resulting in premature repair or replacement of the support bracket. To counteract the excessive wear, multiple embodiments of replaceable sleeves of harder material were developed for the fingers of the support bracket.

Figure 2:
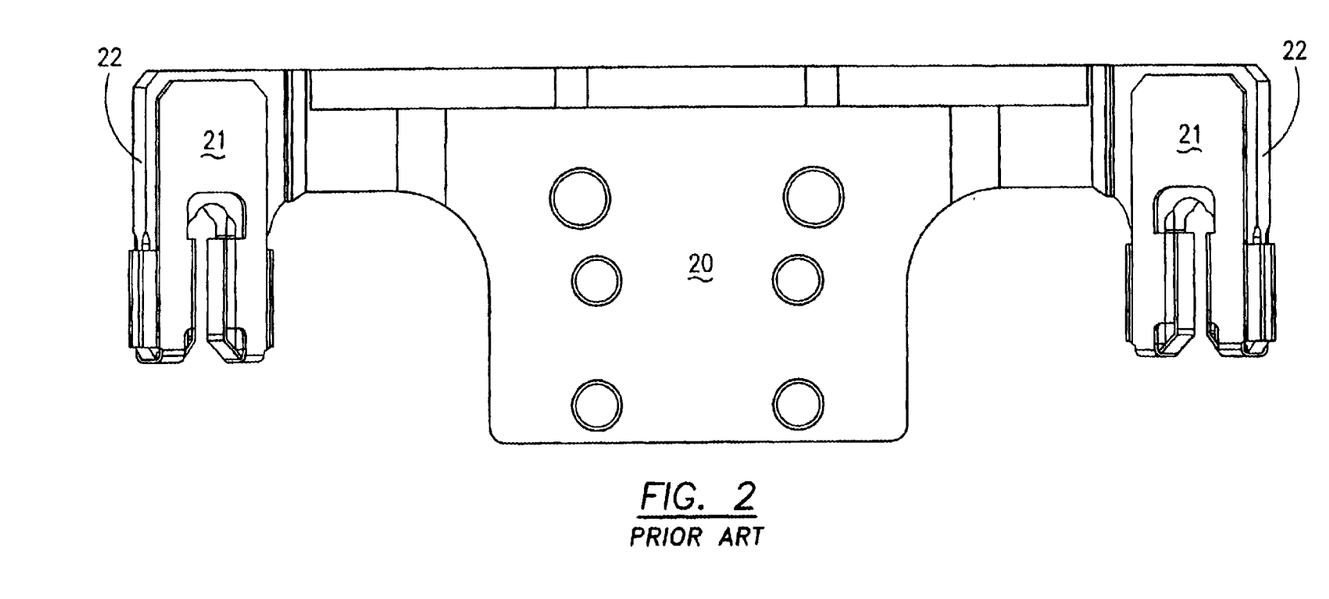
FIG. 2 is a top view of a support bracket assembly including a first embodiment of a wear sleeve of the prior art.
Figure 3A:
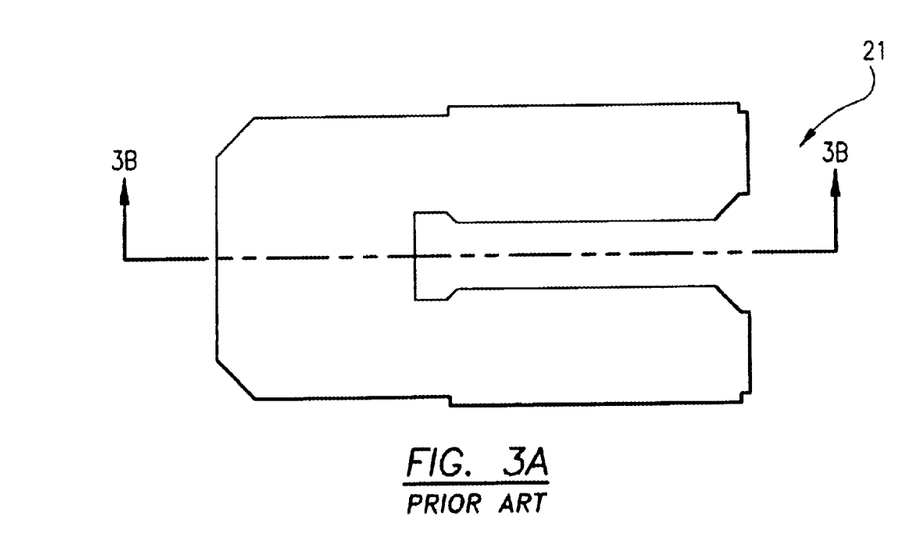
FIG. 3A is a top view of a first embodiment wear sleeve of the prior art.
Figure 3B:
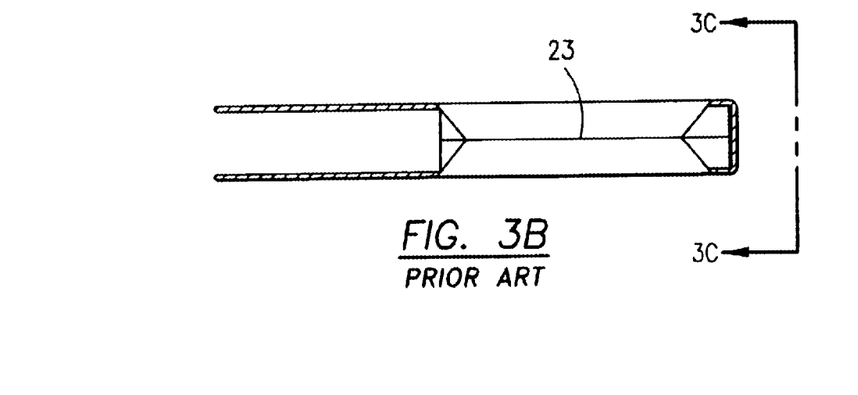
FIG. 3B is an elevation view of a first embodiment wear sleeve of the prior art.
Figure 3C:
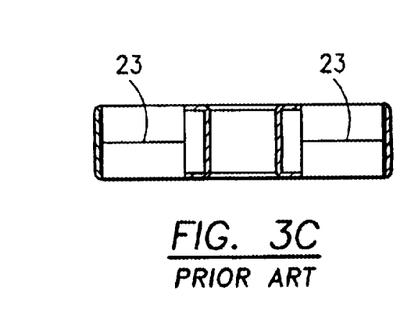
FIG. 3C is an end view of a first embodiment wear sleeve of the prior art.

A first embodiment of a sleeve of the prior art is shown in FIGS. 2 and 3. FIG. 2 shows a top view of a support bracket 20 having sleeves 21, where sleeves 21 encompass all sides of bracket fingers 22. Referring to FIGS. 3A–3C, sleeve 21 is shown in detail. While the sleeve tends to reduce wear to the support bracket fingers, it is a complex assembly with respect to manufacturing. In order to manufacture this configuration, a half sleeve must be cut-out in a flat pattern and complex forming dies are then used to form the halves of the sleeve from the flat pattern. Next the two halves are welded together along joints 23, such that sleeve 21 will encompass all sides of fingers 22. The two halves are then welded together according to strict dimensional tolerances to avoid a loose-fitting sleeve. Finally, heat treatment of weld joints 23 occurs to relieve stresses in the welds, to prevent cracking. As a result of this extensive manufacturing process, the cost of this sleeve design is expensive, often as much as 25%–35% of the support bracket cost.

Figure 4:
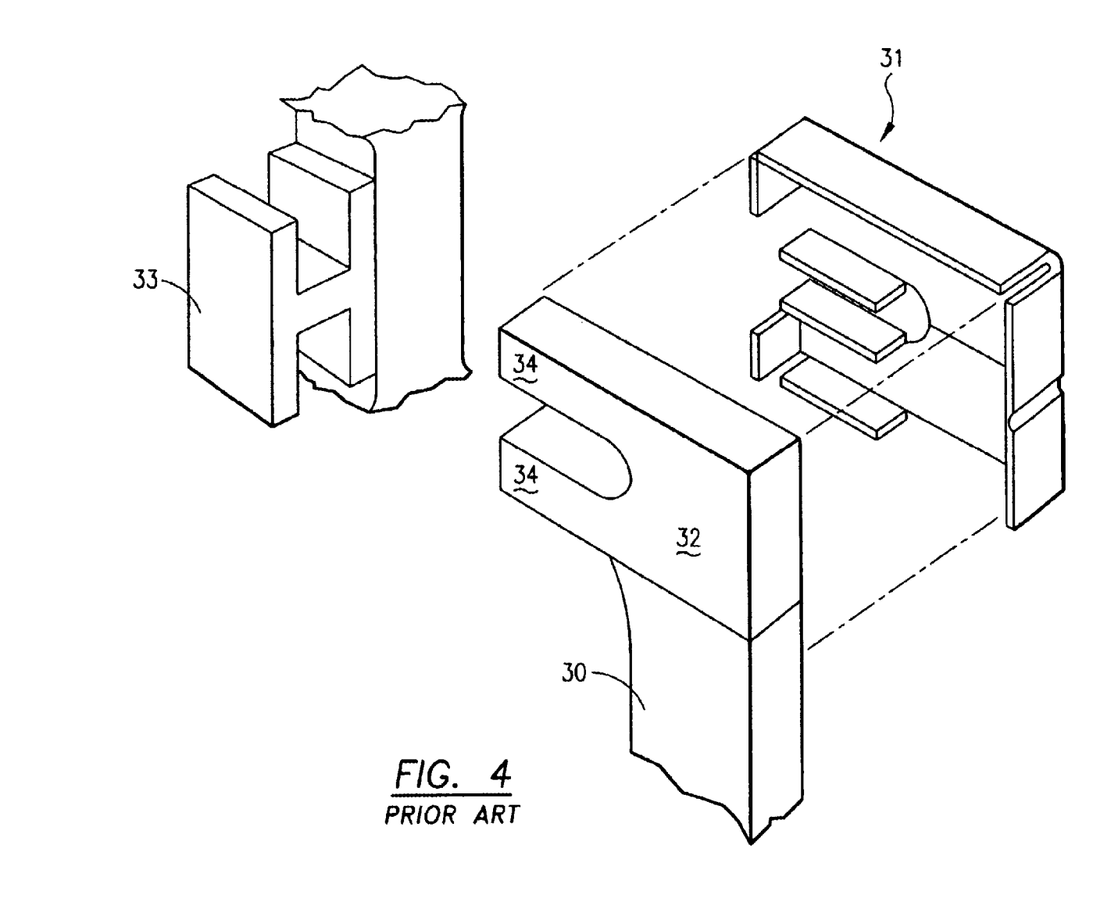
FIG. 4 is an exploded view of a support bracket assembly, including a second embodiment of a wear sleeve, and transition duct mounting block of the prior art.
Figure 5:
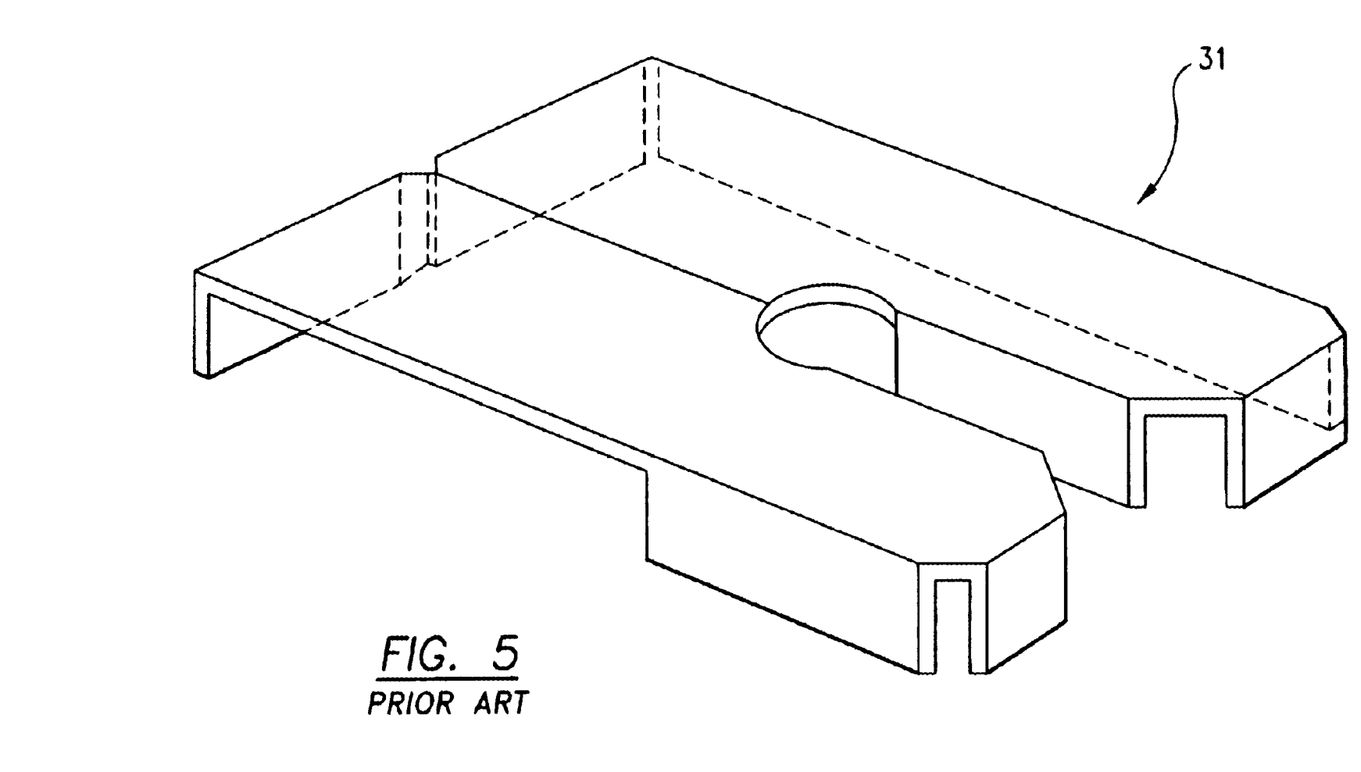
FIG. 5 is a perspective view of a second embodiment wear sleeve of the prior art.

A second embodiment of a sleeve of the prior art is shown in FIGS. 4 and 5. FIG. 4 shows a support bracket 30, sleeve 31, support bracket fingers 32, and transition duct mounting block 33. As with the first embodiment of the prior art, sleeve 31 is designed to protect fingers 32 from excessive wear due to contact with mounting block 33. The critical surfaces of fingers 32 to protect are those that are in contact with corresponding surfaces of mounting block 33. As it can be seen in FIG. 4, this second embodiment does not protect all of the desired surfaces of fingers 32. Specifically, the underside surface 34 is left exposed and unprotected from mounting block 33. Furthermore, as with the first sleeve embodiment, the second embodiment also requires complex manufacturing techniques to prepare a sleeve in a flat pattern, then form it into the final shape as shown in FIG. 5.

While each of these prior art embodiments have reduced the amount of wear experienced on some surfaces of a transition duct support bracket, neither embodiment provides complete wear reduction capability on all critical surfaces, while being cost efficient to manufacture.

SUMMARY AND OBJECTS OF THE INVENTION

The present invention seeks to overcome the shortfalls of the prior art by providing a wear cover for a transition duct support bracket that provides wear protection on all critical surfaces of the support bracket fingers while having a configuration that is more cost efficient to manufacture. The wear cover disclosed in the present invention contains a first and second leg portions, substantially parallel to each other, and a third leg portion generally perpendicular to the first and second leg portions. The leg portions are interconnected by two regions of curvature, which together form the wear cover. The wear cover is manufactured from a single sheet of material that is easily formed to the desired geometry and does not require any assembly or welding, thereby significantly reducing the manufacturing time. Furthermore, due to the improved design and simpler manufacturing techniques, component cost is reduced by more than 50%, with the majority of the remaining cost due to the sheet metal not manufacturing. The wear cover easily slides over each finger of a support bracket and is then fixed to the finger to protect its surfaces that are in contact with a transition duct mounting block. Each of the wear cover leg portions have a width extending a distance such that the support bracket finger is protected over the entire contact surface with a mounting block.

It is an object of the present invention to provide a wear cover for a transition duct support bracket that has reduced manufacturing complexity and can be produced at a lower cost.

In accordance with these and other objects, which will become apparent hereinafter, the instant invention will now be described with particular reference to the accompanying drawings.

DETAILED DESCRIPTION OF THE PREFERRED EMBODIMENT

Figure 6:
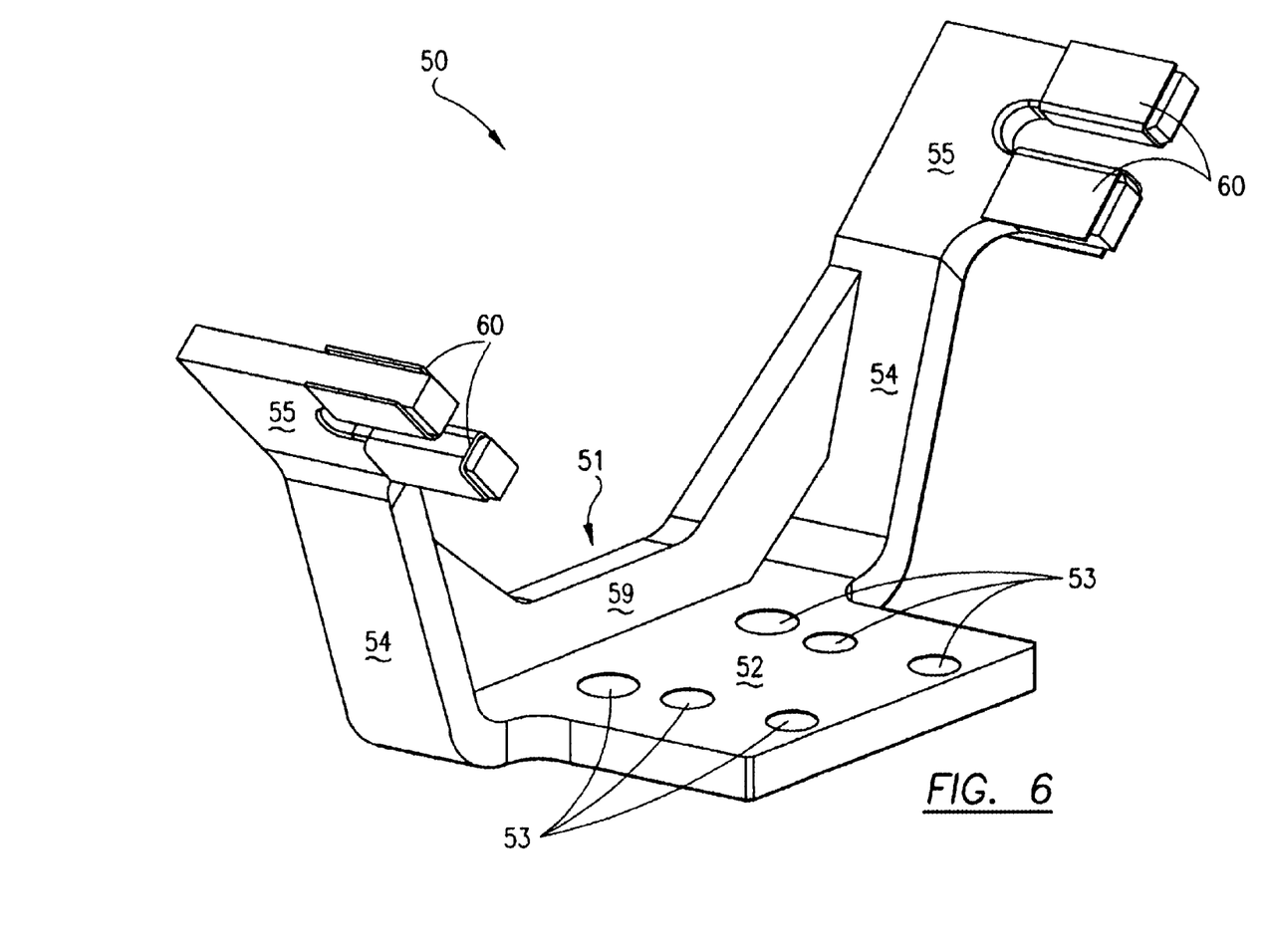
FIG. 6 is a perspective view in accordance with the present invention.
Figure 7:
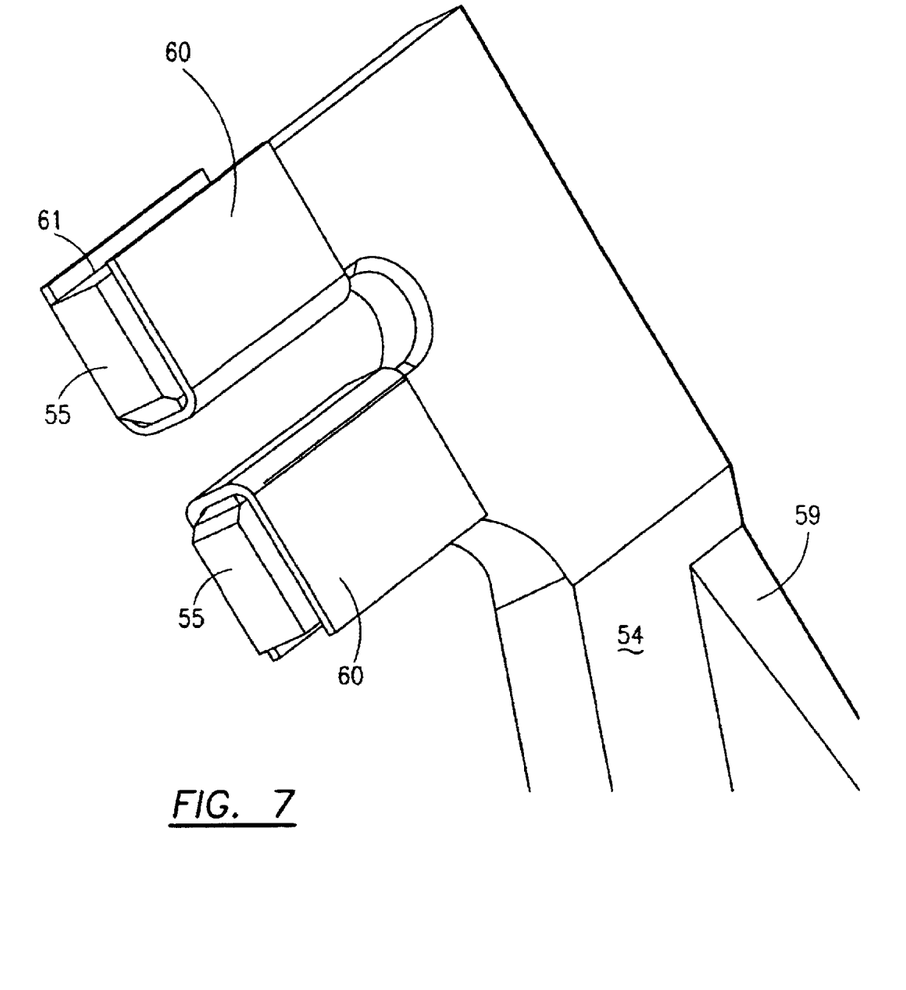
FIG. 7 is a detailed perspective view of the fingers of a support bracket assembly in accordance with the present invention.
Figure 8:
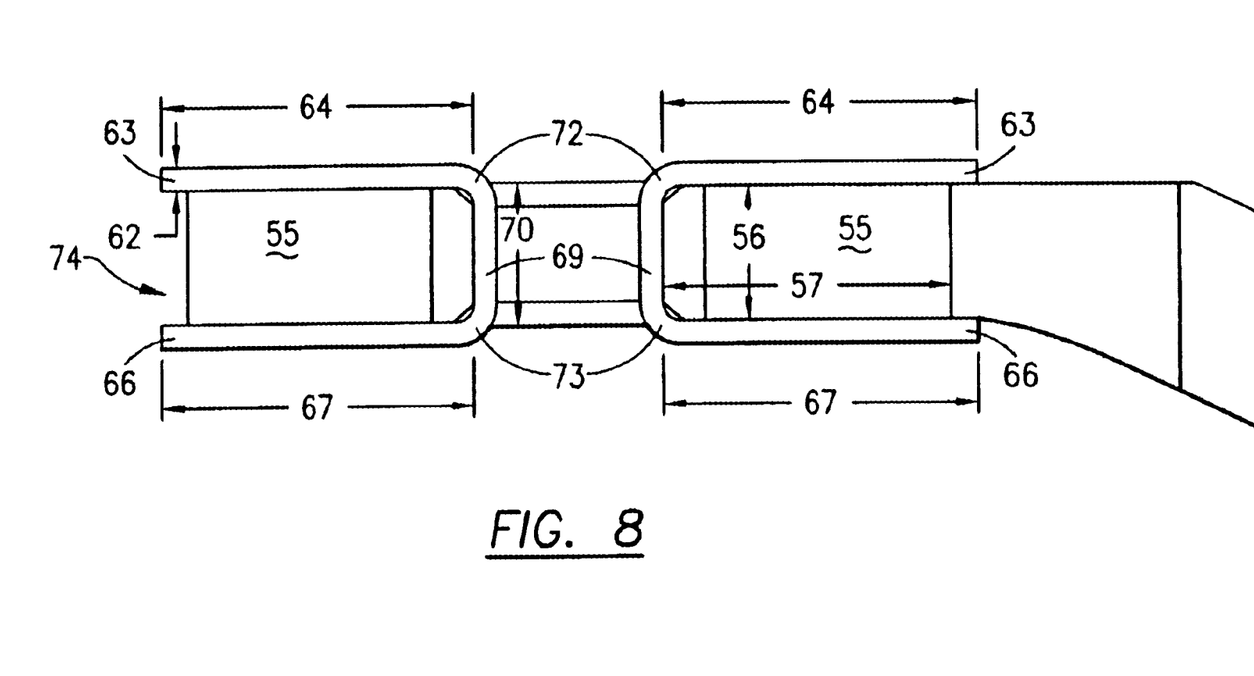
FIG. 8 is a detailed end view of the fingers of a support bracket assembly in accordance with the present invention.
Figure 9:
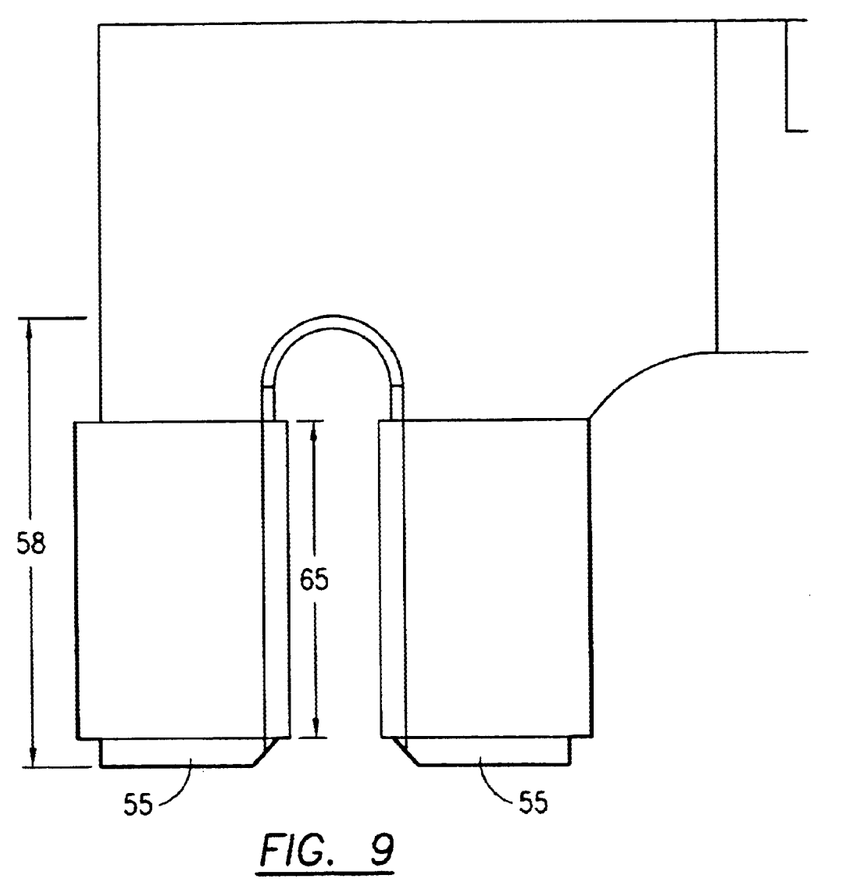
FIG. 9 is a detailed top view of the fingers of a support bracket assembly in accordance with the present invention.

The present invention is shown in detail in FIGS. 6–9, with a support bracket assembly 50 shown in perspective view in FIG. 6. Bracket assembly 50 includes a support bracket 51 having a mounting plate 52, which contains a plurality of holes 53 for securing support bracket assembly 50 to a gas turbine engine. Support bracket 51 also contains a plurality of support arms 54 that extend outward from mounting plate 52, with each support arm 54 having at least one finger 55 for engagement with a transition duct. Referring briefly to FIGS. 8 and 9, at least one finger 55 also has a first thickness 56, typically at least 0.250 inches, a first length 57, and a first width 58. In the preferred embodiment of the present invention, support bracket 51 contains four fingers 55, such that two fingers extend from each support arm 54. Referring back to FIG. 6, support bracket 51 also contains a reinforcement plate 59 that is generally perpendicular to mounting plate 52 and is fixed to both mounting plate 52 and support arms 54.

Referring now to FIGS. 6 and 7, bracket assembly 50 also includes a wear cover 60 positioned substantially around and fixed to each finger 55 of support bracket 51. Wear cover 60, which is manufactured from a material having hardness greater than that of support bracket 51, is fixed to finger 55 along joint 61, typically by a means such as welding. Referring now to FIGS. 8 and 9, wear cover 60, which is formed from a single sheet of metal, has a second thickness 62, typically at least 0.031 inches. Wear cover 60 comprises a first leg portion 63 having a second length 64 and second width 65 and a second leg portion 66 in spaced relation and generally parallel to first leg portion 63 and having a third length 67 and a third width 68. In order to provide adequate wear protection on both sides of finger 55, second length 64 and third length 67 are substantially equal, yet they are each greater than first length 57 in order to create joint 61. Wear cover 60 also includes a third leg portion 69 that is generally perpendicular to both first leg portion 63 and second leg potion 66, and has a fourth length 70 and a fourth width 71. In the preferred embodiment of the present invention both second length 64 and third length 67 are greater than fourth length 70 of wear cover 60. Furthermore, since wear cover 60 is formed from a single sheet of metal, each of second width 65, third width 68, and fourth width 71 are substantially equal. First leg portion 63 is connected to third leg portion 69 at a first region of curvature 72 while second leg portion 66 is connected to third leg portion 69 at a second region of curvature 73. Therefore, when wear cover 60 is formed, the resultant is a three-sided cover with a first opening 74 opposite third leg portion 69. In order to assemble wear cover 60 onto finger 55 of support bracket 51, first opening 74 is greater than first thickness 56 of finger 55.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What is claimed is:

1. A support bracket assembly having improved wear resistance utilized to position a transition duct in a gas turbine combustor, said bracket assembly comprising:

a support bracket comprising:
        a mounting plate having a plurality of holes for securing said support bracket assembly to an engine;
        a plurality of support arms extending outward from said mounting plate, each of said support arms having at least one finger for engagement with a transition duct, said at least one finger having a first thickness, first width, and first length;
        a reinforcement plate generally perpendicular to said mounting plate and fixed to said mounting plate and said support arms;
    a wear cover having a second thickness positioned substantially around and fixed to each of said fingers, said wear cover comprising:
        a first leg portion having a second length and second width;
        a second leg portion in spaced relation and generally parallel to said first leg portion and having a third length and third width;
        a third leg portion generally perpendicular to each of said first leg portion and said second leg portion and having a fourth length and fourth width;
        said first leg portion connected to said third leg portion at a first region of curvature and said second leg portion connected to said third leg portion at a second region of curvature such that said wear cover has a first opening opposite said third leg portion; and,
        wherein said second, third, and fourth widths of said wear cover are substantially equal.

2. The support bracket assembly of claim 1 wherein said support bracket contains four fingers.

3. The support bracket assembly of claim 1 wherein said first thickness of said at least one finger is at least 0.250 inches.

4. The support bracket assembly of claim 1 wherein said second thickness of said wear cover is at least 0.031 inches.

5. The support bracket assembly of claim 1 wherein said second and third lengths of said wear cover are substantially equal.

6. The support bracket assembly of claim 5 wherein said second and third lengths are greater than said fourth length of said wear cover.

7. The support bracket assembly of claim 5 wherein said second and third lengths of said wear cover are greater than said first length of said at least one finger.

8. The support bracket assembly of claim 1 wherein said first opening of said wear cover is greater than said first thickness of said at least one finger.

9. The support bracket assembly of claim 1 wherein said wear cover is welded to said at least one finger.

10. The support bracket assembly of claim 1 wherein said wear cover is manufactured from a material having a hardness greater than that of said support bracket.

* * * * *